(12) United States Patent
Gromyko

(10) Patent No.: US 7,434,132 B2
(45) Date of Patent: Oct. 7, 2008

(54) METHOD AND SYSTEM OF CONFIGURING A SOFTWARE PROGRAM

(75) Inventor: Tatjana Gromyko, Heidelberg (DE)

(73) Assignee: SAP AG, Walldorf (DE)

( * ) Notice: Subject to any disclaimer, the term of this patent is extended or adjusted under 35 U.S.C. 154(b) by 807 days.

(21) Appl. No.: 11/036,106

(22) Filed: Jan. 18, 2005

(65) Prior Publication Data
US 2006/0161806 A1 Jul. 20, 2006

(51) Int. Cl.
*G06F 11/00* (2006.01)
(52) U.S. Cl. .......................................... 714/747; 714/48
(58) Field of Classification Search ................. 712/244; 382/275; 704/275; 345/440.1; 714/57, 747, 714/48
See application file for complete search history.

(56) References Cited

U.S. PATENT DOCUMENTS

| | | | |
|---|---|---|---|
| 6,289,446 B1 * | 9/2001 | Nilsson | 712/244 |
| 6,614,946 B1 * | 9/2003 | Edgar et al. | 382/275 |
| 7,082,555 B2 * | 7/2006 | Toyooka et al. | 714/48 |
| 7,164,422 B1 * | 1/2007 | Wholey et al. | 345/440.1 |
| 2005/0177373 A1 * | 8/2005 | Cooper et al. | 704/275 |

* cited by examiner

*Primary Examiner*—David Ton
(74) *Attorney, Agent, or Firm*—Kenyon & Kenyon LLP

(57) ABSTRACT

Methods and systems are presented herein to correct a defective variable value entered into a system during configuration. In some embodiments, in response to a runtime error, a variable may be identified; help-text specific to the variable may be output; new data may be read and used to replace the value of the variable. After replacement, the method may re-execute the program. In some embodiments, a method may determine if the variable value was entered during system configuration and if so, then it may be determined if the value is defective. If so, then outputting, reading, and replacing may occur; but, if the variable value was not entered during system configuration, then the system may continue to be monitored for a next runtime error. In some embodiments, it may be determined if the variable value of is defective by verifying that the value satisfies a predefined set of rules.

21 Claims, 4 Drawing Sheets

ERROR
   Yield curve 0990 EUR for 17.09.2004 not found.

FIG. 1A

ERROR
   Yield curve 0990 EUR for 17.09.2004 not found.
   See User's Manual for Error Message No. RY404 for additional information.

DIAGNOSIS
   Yield curve type 0990 for currency type EUR on date of 17.09.2004 has no interest rate data available for reading.

PROCEDURE
   Use an interest rate corresponding to the default value of 6.0% for <u>yield curve type 0990</u>, or enter data, or a link to a data location, in the configuration table for Live Data at ADDR 0101.
   —102

FIG. 1B

ENTER AND EVALUATE YIELD CURVES

| Yield curve type | 0990 | ⇨ | to | | ⇨ |
| Currency type | EUR | ⇨ | to | | ⇨ |
| Date | 17.09.04 | ⌨ | to | | ⌨ |

FIG. 1C

METHOD AND SYSTEM OF CONFIGURING A SOFTWARE PROGRAM

BACKGROUND

This invention relates generally to computer systems. More particularly, this invention relates to systems and methods for facilitating correction of defective variable values used to configure computer systems and/or software.

In many industries, such as travel and banking, one provider may create a single computer and/or software system (hereinafter the "system" or "systems") that is used by multiple unrelated users. In order to make the system user friendly for unrelated users, the provider could customize each system before shipment. This, however, is time consuming and often not economically advantageous for the provider. Another way to make the system user friendly for unrelated users could be to provide each user with an ability to enter its own configuration data (i.e., assign values to variables predefined by the provider). A user could use this configuration data to make the systems unique to the user and the user's field of endeavor.

The process of entering system configuration data can be an extremely daunting task, particularly in the context of large systems that contain hundreds of configuration variables. Users may have undergone long hours of training to understand and implement the configuration of their systems. Oftentimes, consultants must be hired who are familiar with the steps necessary to configure a system, but who have no stake or experience in the user's field of endeavor. If the system's configuration is defective, that is, if the values of one or more variables are in error, the system may issue an error message. However, error messages often do not give enough information about the error, its cause, and/or ways to remedy the error. Such error messages are not helpful to the user. Accordingly, when entry of configuration data results in errors during computer runtime, the user must often turn to the provider's engineering or support groups for further support. This wastes time and money. FIG. 1A is an example of an unhelpful error message.

According to empirical evidence, between 20 and 30 percent of errors reported by customers of SAP are based on erroneous system configuration.

What is needed is a system and method to detect errors caused by defective variable values (whether limited to configuration variable values or not), evaluate suspected defective values, and provide a user with error messages that may include helpful content if the data is found to be defective (i.e., in error). Additionally, in some systems, automatic correction of defective variable values is also desirable.

BRIEF DESCRIPTION OF THE DRAWINGS

FIG. 1A is an example of an unhelpful error message.

FIG. 1B is an example of an error message with helpful help-text in accordance with an embodiment of the invention.

FIG. 1C is an example of a system configuration screen in accordance with an embodiment of the invention.

DETAILED DESCRIPTION

Figure 2:
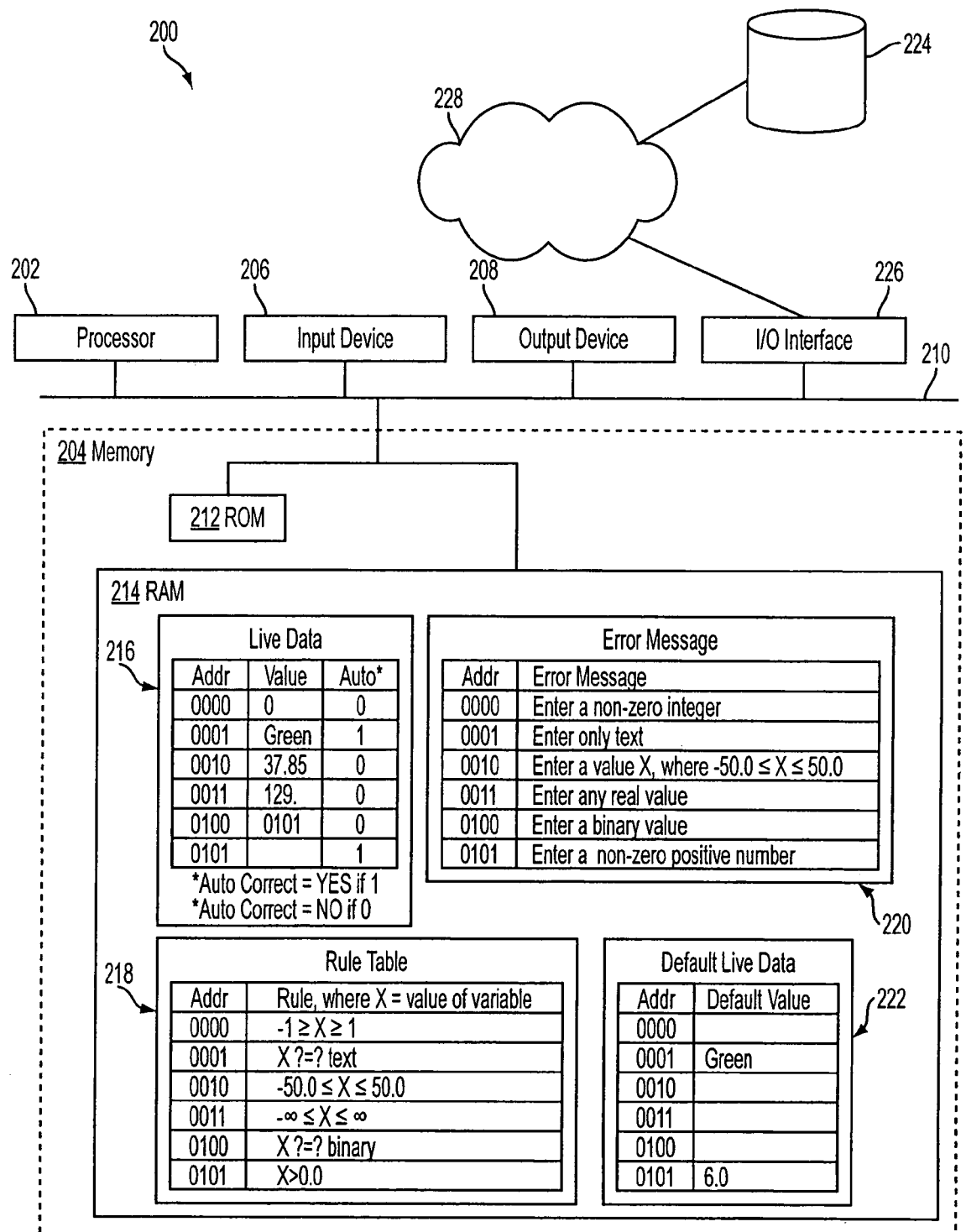
FIG. 2 is a simplified block diagram of a system 200 in accordance with an embodiment of the invention.

Disclosed herein is a system and method to detect errors caused by defective variable values (whether limited to configuration variable values or not), evaluate suspected defective values, and may provide a user with error messages that include helpful content (hereinafter the "error message") if the data is found to be defective (i.e., in error). In some embodiments, automatic correction of defective variable values may be implemented. In some embodiments, a link may also be provided to a configuration screen, whereby a user can expeditiously correct the error according to guidance provided in the error message. The system and method may enable users to efficiently correct errors resulting from at least the system configuration process, using error messages related to the error.

By way of example, configuration data may be entered into fields used to store the data. The fields may be included in tables. If the system configuration data is defective, then in some embodiments, the system may: determine which variable(s) caused an error; identify the field(s) associated with the variable(s) that caused the error; evaluate the identified field(s) for defective value(s); output error messages to a user; and may effectively dialogue with the user to correct the defective value(s). Each error message may be pertinent to a specific variable and helpful to the user in correcting a defect in the value. The error message may include, for example, suggested values, value ranges, diagnosis, corrective procedures, and/or advice in selecting values. The user may study the error message before selecting a new value or perhaps selecting a value suggested in the error message, to replace the defective value of a variable. In some embodiments, error detection with error messages containing helpful content may be limited to system configuration variables.

FIG. 1A is an example of a typically unhelpful error message without helpful information. FIG. 1B is an example of an error message that includes helpful information in accordance with an embodiment of the invention. In some embodiments, the error message may provide a link to a system configuration screen (e.g., hypertext link), whereby a user can correct the error according to the guidance provided in the error message. FIG. 1C is an example of a system configuration screen in accordance with an embodiment of the invention. In this example, the system configuration screen is a user display that enables a user to enter and evaluate financial yield curves. In some embodiments, once a new value replaces a defective value, the system may then re-execute the program and repeat the steps for error detection and correction if further errors are encountered. Ultimately, errors due to defective variable values may be eliminated and, so long as all other components of the system are error-free, the system should function as programmed. It is also possible, in an alternate embodiment, to allow the system, when it encounters defective variable values, to automatically select replacement values from a predefined set of default data. In this alternate embodiment, dialogue with the user is preferably not required. Of course, a combination of the previous two embodiments is also available.

FIG. 2 is a simplified block diagram of a system 200 in accordance with an embodiment of the invention. The system 200 is illustrated as including a processor 202, a memory system 204, an input device 206, and an output device 208. One or more busses 210 (e.g., communications bus, data bus, etc.) may couple some or all of the components of the system 200. The processor 202 may be any of a plurality of conventional processing systems, including microprocessors, digital signal processors, and field programmable logic arrays. In some applications, it may be advantageous to provide multiple processors (not shown) in the system 200. The processor 202 may execute program instructions stored in the memory system 204. The memory system 204 may include any combination of conventional memory circuits, including electrical, magnetic, or optical memory systems. As shown in FIG. 2, the memory system may include, for example, read only memories 212 and random access memories 214. Components of the memory system may be located remotely from the processor. For example, a hard disk or bulk storage device 224 may not be in physical proximity to the processor 202 but may be located, for example, on the other side of the world. This hard disk or bulk storage device 224 may be coupled to the system 200 via an I/O interface 226 and a communications network 228, such as the Internet. Of course, input and output devices may also be remotely coupled to the system. The memory system 204 not only stores the program instructions representing the various methods described herein but may also store data on which these methods operate.

As is known in the art, computer programs execute code that causes a processor to perform mathematical operations on arithmetic values. While some of the arithmetic values are permanently embedded in the computer program code, other arithmetic values are represented by variables. The arithmetic values represented by the variables may be stored in a memory system, such as memory system 204. While it is understood that values may be stored in the memory system in various formats depending on the type of memory or the design of the software, conceptually, and for exemplary purposes herein, it is convenient to illustrate and discuss values (data) as being stored in tables or fields within a memory. Accordingly, for purposes of illustration, four tables 216, 218, 220, 222 are illustrated as being included in RAM 214, which is in memory system 204. The data included in these tables could be held, for example, in database structures or arrays initialized to accept such data. Nothing herein is meant to restrict the storage of data to RAM or fields in tables. It is noted that both numbers and letters may be stored as arithmetic values.

Memory system 204 is illustrated as including RAM 214 having four tables of data stored therein. Each table is divided into rows and columns. Each cell of the table represents a field of data. For purposes of illustration, each table is divided into six rows. The first table 216 has three columns, while the second through fourth tables 218-222 have two columns each. For convenience, the first row of each table is illustrated as a header row and contains no data. The first table 216 may contain configuration variables (live data). The second table 218 may contain rules for evaluation of values of variables. The third table 220 may contain predefined error messages. The fourth table 222 may contain default values for use as replacement data if the system is set to automatically correct defective variable values.

Either before or during program execution, in accordance with the program's design, a user may store configuration data in tables or fields within a memory, such as first table 216. The processor may use this data during program execution. If, however, the processor uses defective data, an error may result that will cause the program to stop execution. As used herein a defective variable value includes, but is not limited to:

negative values, where values greater than or equal to zero are expected;
negative values, where values greater than zero are expected;
positive values, where values less than or equal to zero are expected;
positive values, where values less than zero are expected;
values that would result in mathematical errors (such as divide by zero);
null or blank values (i.e., the table or field was not populated with any data);
alpha characters, where numeric characters were expected;
numeric characters, where alpha characters were expected; and
strings of improper length; etc.

This list is meant to be illustrative and not limiting.

An error during program execution may cause an unhelpful error message to be displayed on an output device, such as output device 208, by the processor 202. FIG. 1A is an example of an unhelpful error message. This presents a problem, as the user may not be able to understand the significance of the error message and may have to rely on engineering and support staff of the system and/or software provider to correct the problem.

In accordance with one embodiment of the invention, the second table 218 may store rules pertinent to each data location in the configuration table (e.g., first table 216). The rules in the second table 218 may be used to determine if the variable data entered, or not entered, into the first table 216 is valid.

The requirements for valid data may vary depending on the system requirements. For example, as shown in rule table 218 of FIG. 2, data may be required to be expressed as: a non-zero integer; as text; as real value bounded by upper and lower limits; as any unbounded real value; as a binary number; or as a non-zero positive number. These examples are not meant to be limiting. An example of invalid data may be as follows: if a processor divides a number in a first memory location by a number in second memory location, but the number in second memory location is zero, then a divide-by-zero error will occur. Using the divide-by-zero example, if the number in the second memory location was read from a field in configuration table 216 (see, e.g., value field for Address 0000), then the rule corresponding to that field (stored in the second table 220) should indicate that the value stored in that field cannot equal zero.

The benefit of helpful text provided to users when confronted with an error is illustrated in FIG. 1. In this instance, data needed for a calculation was not entered during system configuration. A resulting unhelpful error message, "Yield curve 0990 EUR for 17.09.2004 not found" is illustrated in FIG. 1A. FIG. 1B, however, illustrates that the general message of FIG. 1A can be displayed along with useful, meaningful, and informative help-text (collectively referred to herein as the "error message"). For example, the error message itself includes the relevant error message number: "Message No. RY404." Moreover, a diagnosis and a procedure to correct the error are also displayed to the user. The diagnosis resulting from this error was that "Yield code 0990(EUR) has reading procedure 0", meaning that no data was available for reading. The system advises that the procedure to correct the error entails "Maintain the reference interest rates corresponding to the reading procedure for the yield curve 0990, or use a different reading procedure." In the illustration of FIG. 1B, a link 102 (see underlined text in FIG. 1B) to a user screen useful for yield curve type 0990 is also provided. A user screen, in accordance with an embodiment of the invention, that may be useful for yield curves, including yield curve type 0990, is illustrated in FIG. 1C. Of course, it will be understood that helpful error messages are not limited to the format illustrated in FIG. 1B.

In some embodiments, once an error occurs the processor 202 may determine which variables were being operated on at the time of the error, and may determine in which memory locations, tables, or fields (e.g., 216) the values of these variables are stored. That is, the processor may determine which variables were being operated on at the time of an error and may then determine the memory or storage locations of the values of those variables. The values in these locations can then be evaluated according to a predefined set of rules. For example, an evaluation may comprise a comparison of each suspect configuration field in the first table 216 with a corresponding rule from the second table 218.

Upon identification of defective value, the system 200 may prompt the user to correct the defective value. In order to provide helpful content in an error message, a third table 220 may be used to store help-text pertinent to corresponding fields in the first table 216. In some embodiments, upon identification of the defective value, the processor 202 may display the error message with the help-text stored in the third table 220 to a user. The processor 202 may additionally or alternatively make use of the rules stored in the second table 218 to identify acceptable values to the user for the subject data location. Alternatively, the rules could be incorporated into the text of the third table 220.

In some embodiments, the processor 202 may execute code to correct a defective variable value without intervention of a user. In some embodiments, a fourth table 222 may store predefined default values for selected variables in the first table 216. Some or all of the variables may have predefined default values. If the processor's 202 instructions are to automatically correct the defective data, then upon detection of defective value the processor 202 may copy the default value into the memory location occupied by the defective value in the first table 216.

In some embodiments, upon correction of a defective value the processor may re-execute the program. The program may be re-executed from its start. The method of the invention may be repeated as many times as necessary. Repetition may be useful, for example, to eliminate all defective values from the configuration table 216.

By way of example, the tables of FIG. 2 illustrate six memory addresses (labeled 0000 through 0101) in each of the tables 216-222. In the first table 216, the value of "0" is stored at address 0000. A flag having a value of "0" is illustrated as being stored at the same address but in a column labeled "Auto." For purposes of illustration, a value of "0" in the Auto column indicates that the system 200 will not automatically correct the value stored at its associated memory address. A value of "1" in the Auto column indicates that the system 200 will automatically correct the value stored at its associated memory address. The use of the third column labeled "Auto" is optional and, in some embodiments, is useful for instances in which the system is enabled to automatically correct defective values. As a program using the data stored at first table's memory address 0000 runs, an error will occur as a value of zero occupies that location. In some embodiments, the system may: detect the error; determine that it was the variable stored in the first table 216 at address 0000 that caused the error; optionally determine that the variable stored in that location was entered by a user to customize the system 200 (by, for example, use of another flag (not shown) or definitions that identify all data stored in the first table 216 as being data entered by a user to customize the system or other mechanisms as known to those of skill in the art); and make a determination as to whether the data value is defective. In some embodiments, the value of the variable stored in the first table 216 is evaluated according to a corresponding rule stored in a second table 218 at the same address. The rule for this location requires that the value not equal zero. As the value of "0" violates this rule, the system may output an error message stored, for example, at the same address in the third table 220. Accordingly, a user may see a helpful error message indicating the user should "Enter a non-zero integer" for variable X. In the example as illustrated in FIG. 2, automatic correction of the defective value was not carried out as the flag for address 0000 in the Auto column of the first table 216 was set to "0."

By way of further example, as the program using the data stored at first table memory address 0101 runs, an error will occur as a null or blank value occupies that location. In some embodiments, the system may: detect the error; determine that it was the variable stored in the first table 216 at address 0101 that caused the error; optionally determine that the variable stored in that location is a configuration variable (by, for example, use of another flag (not shown) or definitions that identify all data stored in the first table 216 as being data entered by a user to customize the system or other mechanisms as known to those of skill in the art); and make a determination as to whether the data is defective. In the example as illustrated in FIG. 2, some embodiments, the value of the variable stored in the first table 216 is compared to a corresponding rule stored in a second table 218 at the same address. The rule for this location requires that the value be greater than zero. As the value of "null" is not greater than zero, the system may automatically replace the blank space with the value of "6.0," which is the default value stored in a fourth table 222 at the same address, 0101, as the defective value in the first table. It is noted that in this instance, automatic correction of a defective variable value was carried out as the flag for address 0101 in the Auto column of the first table 216 was set to "1."

Figure 3:
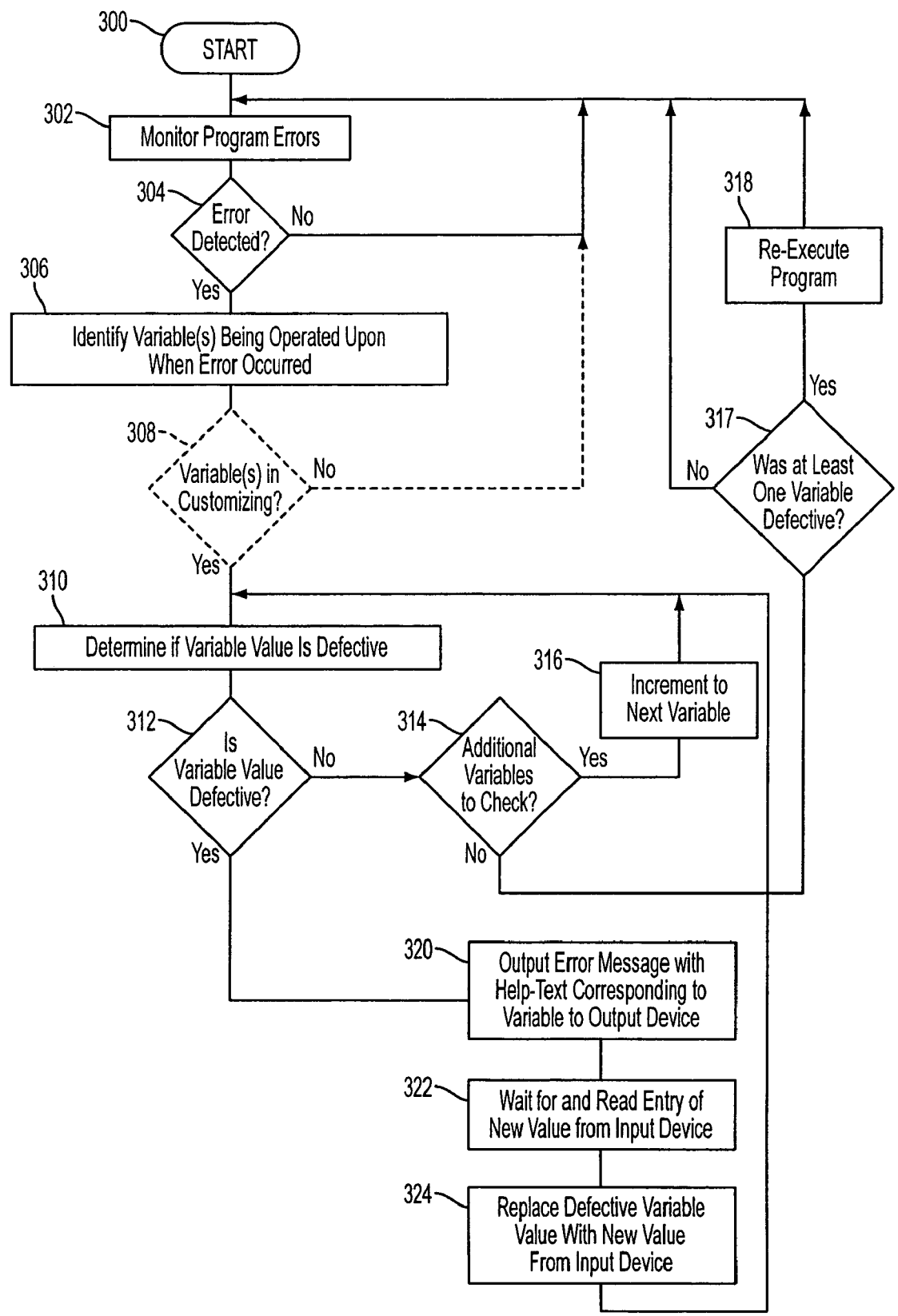
FIG. 3 is a flow diagram of a method in accordance with an embodiment of the invention.

FIG. 3 is a flow diagram of a method in accordance with an embodiment of the invention. The method may begin at 300. It is noted that at this point, a program is running. At 302, the program whose software is running in a system may effectively be monitored to detect runtime errors. At 304, if a runtime error is not detected the method may continue to monitor the program for errors by returning to 302. At 304, if a runtime error is detected, the method may continue to 306. At 306, the processor 202 may execute code to determine which variable(s) were being operated on substantially at the time of the error. At 308, the processor 202 may optionally execute code to determine if at least one of the variable(s) was a configuration variable. If none of the variable(s) that caused the error were configuration variables, then the method may optionally return to 302 and continue to monitor the program for errors. If the optional step at 308 is not used, the method may continue from step 306 to step 310. Or, if the optional step at 308 is used, and if the variable(s) were configuration variables, the method may continue to 310. At 310, it may be determined that the variable value is defective. Such a determination may be made, for example, as indicated above, by evaluating the variable value using a rule specific to that variable. At 312, if the variable value is not defective the method may proceed to 314. At 314, it may be determined if there are additional variables to check.

At 314, if there are additional variables to check then at 316 the method may increment to the next variable and return to 310 where the next variable value may be evaluated to determine if it is defective. The process continues as previously described. At 314, if there are no additional variables to check the method may proceed to 317. At 317, if at least one variable was defective, the method may proceed to 318, where the program may be re-executed. The re-execution may cause the program to run from its beginning. The correction of the defective variable(s) should allow the program to continue without repeating the error caused by the defective variable(s). If, at 317, no variables were defective, then the method may continue at 302 by effectively monitoring the program for errors. If another error occurs, the method may be repeated until all variables, or optionally all configuration variables, are preferably not defective.

Returning to 312, if the variable is determined to be defective then the method may continue to 320. At 320, an error message with help-text may be output to an output device, for a user's consideration. The output device, such as output device 208 (FIG. 2), may be, for example, a video display or a printer. The error message and help-text may be specific to the defective variable(s). The error message and help-text may be helpful to the user in correcting the defective variable(s). The error message and help-text may contain suggested values, value ranges, diagnosis, procedures, and/or advice concerning the defective variable(s). The preceding list is meant to be illustrative and not limiting.

At 322, the method may wait for, and then read, entry of a new variable value from an input device, such as input device 206 (FIG. 2). The input device may be, for example, a keyboard. At 324, once the new value is received from the input device, the new value may replace the defective value. In some embodiments, the new value may be stored in the field that held the defective variable value, thus overwriting the defective value. As a user may not correctly enter the new value, the method may return to 310 where the new value may be checked to determine if it is defective. The method may then proceed as described above.

Figure 4:
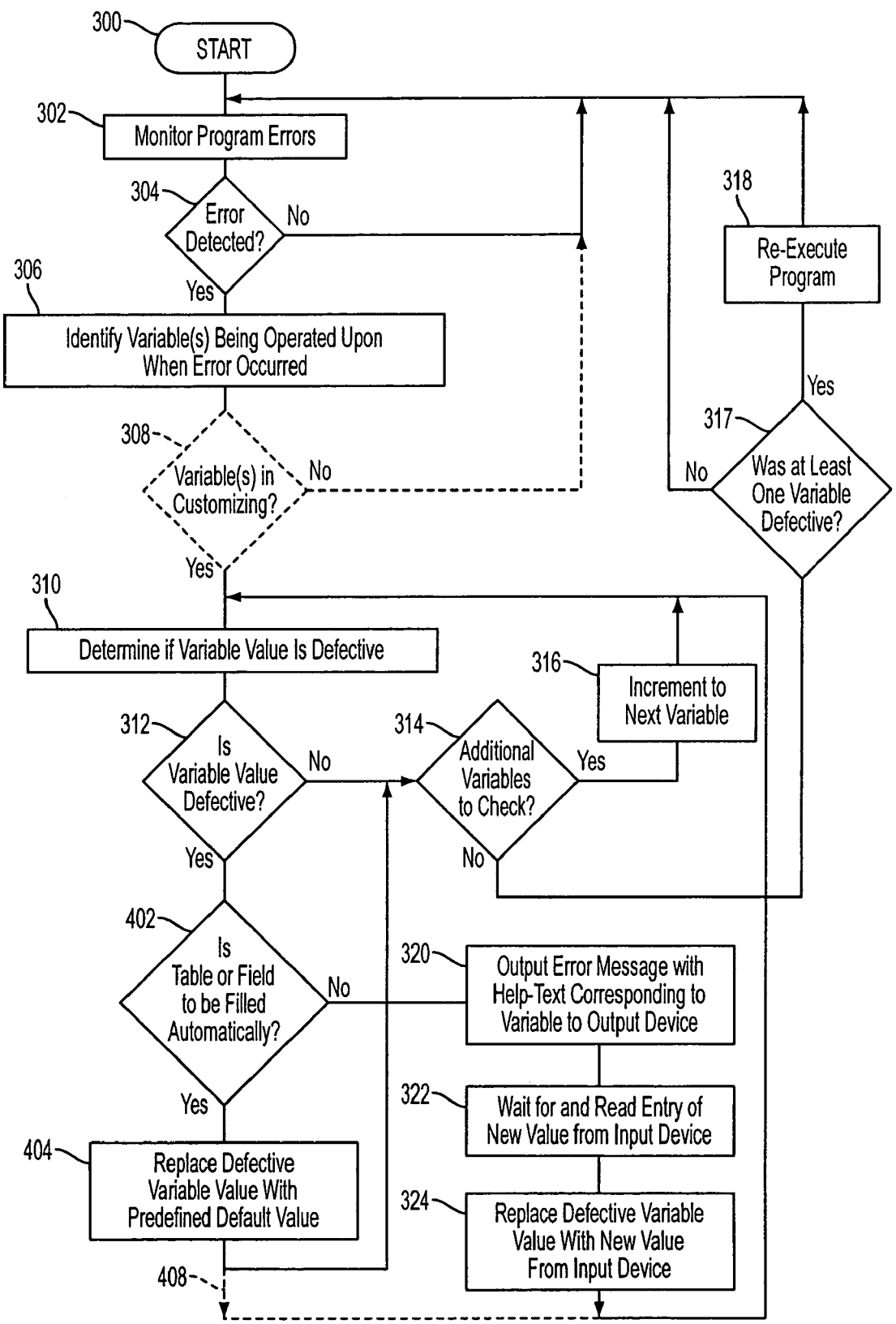
FIG. 4 is a flow diagram of an alternate method in accordance with an embodiment of the invention.

FIG. 4 is a flow diagram of an alternate method in accordance with an embodiment of the invention. In the method of FIG. 4, the defective variable may be automatically replaced with a predefined default value. FIG. 4 is similar to FIG. 3 but adds two elements 402, 404 that may accomplish automatic replacement of the defective variable with the predefined value. A description of elements associated with reference numerals identical to those used in FIG. 3 will not be repeated with reference to FIG. 4, as like reference numerals describe like elements.

The method of FIG. 4 modifies the method of FIG. 3 by inserting decision point 402 in the affirmative path between elements 312 and 320. Specifically, at 312, if the variable value is defective the method may continue to 402 (not directly to 320). In some embodiments, at 402, a determination is preferably made as to whether the system is to automatically (without user input) replace the defective value. This determination may be made, for example, based on a flag value associated with the variable, or using any other method that could indicate that either individually or globally the variable value(s) are to be replaced automatically. If at 402 the variable value(s) are not to be replaced automatically, then the method may proceed to 320 and then may proceed as previously described with reference to FIG. 3. If at 402 the variable value(s) are to be replaced automatically then the method may proceed to 404. At 404, the method may replace the defective variable value with a predefined value. The predefined value may be stored in a table, such as the fourth table 222 of FIG. 2. It may be assumed that the predefined default variable value is not defective, consequently the method may proceed to 314 and then proceed as previously described in FIG. 3. Alternatively, and illustrated in dashed line 408 in FIG. 4, the method may return to 310, where the default variable may be evaluated to determine if it is defective. The method may then proceed as previously described in FIG. 3.

Presented hereinabove are embodiments of the invention. In some embodiments, a method for correcting a defective variable value entered into a computer system during computer system configuration may comprise: identifying a variable being operated upon at the time of the error (in response to a runtime error); outputting help-text specific to the variable to an output device; reading new data from an input device; and replacing the value of the variable with the new data. In some embodiments the method may also re-execute the program. In some embodiments, the method may determine if the variable is a variable whose value was entered during system configuration; and if so, then it may be determined if the value of the variable is defective. In some embodiments, if the value is defective, then outputting, reading, and replacing may occur; but, if the variable is a variable whose value was not entered during system configuration, then the method may return to monitoring the system for a next runtime error. In some embodiments, the method may re-execute the program after outputting, reading, and replacing. In some embodiments, it may be determined if the value of the variable is defective by verifying that the value of the variable satisfies a predefined set of rules established for the variable. In some embodiments, the step of determining if the value of the variable being operated upon is defective may be repeated after a new value replace the defective value, to verify that the new value is not defective. A system, comprising a processor and a memory, may be embodied to execute a set of instructions comprising instructions to perform at least the methods described herein.

In some embodiments, a plurality of instructions to perform the methods disclosed herein may be embodied on a machine-readable medium. In some embodiments, the instructions may comprise instructions to identify a variable being operated upon at the time of an error (in response to a runtime error); output help-text specific to the variable to an output device; read new data from an input device; and replace the value of the variable with the new data. In some embodiments, the machine readable medium may comprise instructions to re-execute the program. In some embodiments, the machine readable medium may comprise instructions to determine if the variable is a variable whose value was entered during system configuration; and if so, then it may comprise instructions to determine if the value of the variable is defective. In some embodiments, if the value is defective, then the machine readable medium may comprise instructions to output, read, and replace the variable value; but, if the variable is a variable whose value was not entered during system configuration, then the machine readable medium may comprise instructions to return to monitoring the system for a next runtime error. In some embodiments, the machine readable medium may comprise instructions to re-execute the program after outputting, reading, and replacing. In some embodiments, the machine readable medium may comprise instructions to determine if the value of the variable is defective by verifying that the value of the variable satisfies a predefined set of rules established for the variable. In some embodiments, the machine readable medium may comprise instructions to repeat the step of determining if the value of the variable being operated upon is defective, after a new value replaces the defective value, in order to verify that the new value is not defective.

While there has been described what are believed to be the preferred embodiment of the present invention, those skilled in the art will recognize that other and further changes and modifications may be made thereto without departing from the spirit of the invention, and it is intended to claim all such changes and modifications as falling within the true scope of the invention.

What is claimed is:

1. A method for correcting a defective variable value entered into a computer system during computer system configuration, comprising:
   responsive to a runtime error, identifying a variable being operated upon at the time of the error;
   outputting help-text specific to the variable to an output device;
   reading new data from an input device; and
   replacing the value of the variable with the new data.

2. The method of claim 1, further comprising re-executing the program.

3. The method of claim 1, further comprising:
   responsive to identification of the variable, determining if the variable is a variable whose value was entered during system configuration; and
   if the variable is a variable whose value was entered during system configuration:
      determining if the value of the variable is defective, and
      if the value is defective, then continuing to the outputting, reading, and replacing; and
   if the variable is a variable whose value was not entered during system configuration:
      return to monitoring the system for a next runtime error.

4. The method of claim 1, further comprising:
   responsive to identification of the variable, determining if the variable is a variable whose value was entered during system configuration;
   if the variable is a variable whose value was entered during system configuration:
      determining if the value of the variable is defective, and
      if the value is defective, then continuing to the outputting, reading, and replacing, and
      re-executing the program; and
   if the variable is a variable whose value was not entered during system configuration:
      return to monitoring the system for a next runtime error.

5. The method of claim 1, wherein outputting, reading, and replacing are performed if the value of the variable is defective.

6. The method of claim 5, wherein it is determined if the value of the variable is defective by verifying that the value of the variable satisfies a predefined set of rules established for the variable.

7. The method of claim 1, further comprising:
   repeating the step of determining if the value of the variable being operated upon is defective; and
   repeating the outputting, reading, and replacing steps, if the new value is defective.

8. A system comprising:
   a processor; and
   a memory, the memory including a set of instructions to be executed by the processor, the instructions comprising instructions to:
      responsive to a runtime error, identify a variable being operated upon at the time of the error;
      output help-text specific to the variable to an output device;
      read new data from an input device; and
      replace the value of the variable with the new data.

9. The system of claim 8, further comprising instructions to re-execute the program.

10. The system of claim 8, further comprising instructions to:
    responsive to identification of the variable, determine if the variable is a variable whose value was entered during system configuration; and
    if the variable is a variable whose value was entered during system configuration:
       determine if the value of the variable is defective, and
       if the value is defective, then continue to the outputting, reading, and replacing; and
    if the variable is a variable whose value was not entered during system configuration:
       return to monitoring the system for a next runtime error.

11. The system of claim 8, further comprising:
    responsive to identification of the variable, determine if the variable is a variable whose value was entered during system configuration;
    if the variable is a variable whose value was entered during system configuration:
       determine if the value of the variable is defective, and
       if the value is defective, then continue to the outputting, reading, and replacing, and
       re-execute the program; and
    if the variable is a variable whose value was not entered during system configuration:
       return to monitoring the system for a next runtime error.

12. The system of claim 8, wherein instructions to output, read, and replace are performed if the value of the variable is defective.

13. The system of claim 12, wherein it is determined if the value of the variable is defective by verifying that the value of the variable satisfies a predefined set of rules established for the variable.

14. The system of claim 8, further comprising instructions to:
    repeat the instructions to determine if the value of the variable being operated upon is defective; and
    repeat the instructions to output, read, and replace, if the new value is defective.

15. A machine-readable medium having stored thereon a plurality of executable instructions, the plurality of instructions comprising instructions to:
    responsive to a runtime error, identify a variable being operated upon at the time of the error;
    output help-text specific to the variable to an output device;
    read new data from an input device; and
    replace the value of the variable with the new data.

16. The machine-readable medium of claim 15, further comprising instructions to re-execute the program.

17. The machine-readable medium of claim 15, further comprising instructions to:
    responsive to identification of the variable, determine if the variable is a variable whose value was entered during system configuration; and
    if the variable is a variable whose value was entered during system configuration:
       determine if the value of the variable is defective, and
       if the value is defective, then continue to the outputting, reading, and replacing; and
    if the variable is a variable whose value was not entered during system configuration:
       return to monitoring the system for a next runtime error.

18. The machine-readable medium of claim 15, further comprising:
    responsive to identification of the variable, determine if the variable is a variable whose value was entered during system configuration;
    if the variable is a variable whose value was entered during system configuration:
       determine if the value of the variable is defective, and if the value is defective, then continue to the outputting, reading, and replacing, and
re-execute the program; and
if the variable is a variable whose value was not entered during system configuration:
return to monitoring the system for a next runtime error.

19. The machine-readable medium of claim 15, wherein instructions to output, read, and replace are performed if the value of the variable is defective.

20. The machine-readable medium of claim 19, wherein it is determined if the value of the variable is defective by verifying that the value of the variable satisfies a predefined set of rules established for the variable.

21. The machine-readable medium of claim 15, further comprising instructions to:
repeat the instructions to determine if the value of the variable being operated upon is defective; and
repeat the instructions to output, read, and replace, if the new value is defective.

* * * * *